United States Patent [19]

Miki et al.

[11] 4,445,528

[45] May 1, 1984

[54] ELECTROMAGNETIC VALVE AND METHOD FOR ASSEMBLY

[75] Inventors: Nobuaki Miki; Shoji Yokoyama, both of Anjo, Japan

[73] Assignee: Aisin Warner Kabushiki Kaisha, Aichi, Japan

[21] Appl. No.: 281,446

[22] Filed: Jul. 8, 1981

[30] Foreign Application Priority Data

Jul. 14, 1980 [JP] Japan .................................. 55-96007

[51] Int. Cl.³ ........................ F16K 11/07; F16K 31/02
[52] U.S. Cl. ................................ 137/315; 137/625.64; 251/30; 251/129; 251/141
[58] Field of Search .................... 137/625.64, 315, 367, 137/870, 884; 251/30, 129, 139, 141; 335/278

[56] References Cited

U.S. PATENT DOCUMENTS 3,688,797 9/1972 Sorenson ....................... 137/625.64
3,963,049 6/1976 Beauregard ......................... 251/129

Primary Examiner—Martin P. Schwadron
Assistant Examiner—James R. Shay

Attorney, Agent, or Firm—Blum, Kaplan, Friedman, Silberman & Beran

[57] ABSTRACT

An electromagnetic valve without an independent casing is provided. The electromagnetic valve includes the housing of a hydraulic control system in which the electromagnetic valve is functionally and physically incorporated. The housing has perpendicularly intersecting first and second wall surfaces and includes a cylindrical cavity bored into the second wall surface with the central longitudinal axis of the cavity being disposed parallel to the first wall surface. A linear groove is formed into the first wall surface perpendicularly to the center axis of the cylindrical cavity and communicates with the cylindrical cavity. A valve port, directly in the housing or in a valve seat member fitted into the housing in alignment with the central longitudinal axis of the cavity, communicates with a fluid conduit in the housing. Valve components are located in the cavity and externally of the cavity is a retainer which engages the components in compression making contact through the linear groove.

16 Claims, 5 Drawing Figures

ELECTROMAGNETIC VALVE AND METHOD FOR ASSEMBLY

BACKGROUND OF THE INVENTION

This invention relates generally to an electromagnetic valve suitable for use in a hydraulic control system for feeding or draining a pressurized fluid to and from a pressure chamber, and more particularly to an electromagnetic valve and a method for assembling said electromagnetic valve, wherein the valve is built into the housing of the hydraulic control system and held therein by a retainer. The valve is built into the hydraulic control system by assembling a coil, plunger, spring and core in a cylindrical bore in the housing of the system.

Electromagnetic valves have been widely used for opening and closing a passage for pressurized fluid which is supplied to or drained from a pressure chamber in a hydraulic mechanism, such as in many types of machine tools or in a hydraulic control system for an automatic transmission of a vehicle. Such an electromagnetic valve of this type is frequently built into the drive or control system. In constructions where the fluid passages are cut into or formed in the housings of the system for the sake of a compact construction, the valve is frequently mounted in a bore which is provided in the casing. In mounting an electromagnetic valve in the casing of the system, the general procedure has been to mount an electromagnetic valve assembly in the casing bore, the valve assembly including a plunger, core, coil and spring. These components are enclosed within an independent valve casing separate from the casing of a hydraulic drive mechanism.

What is needed is an electromagnetic valve construction for use in a hydraulic control system and hydraulic drive mechanisms which elminates the need for an independent valve casing.

SUMMARY OF THE INVENTION

Generally speaking, in accordance with the invention, an electromagnetic valve without an independent casing is provided. The electromagnetic valve includes in combination a housing of a hydraulic control system in which the electromagnetic valve is functionally and physically incorporated. The housing has an end portion defined by perpendicularly intersecting first and second wall surfaces. The housing also includes a cylindrical cavity bored into the second wall surface with the central longitudinal axis of the cavity being disposed parallel to the first wall surface. A linear groove is bored into the first wall surface perpendicularly to the center axis of the cylindrical cavity and the linear groove communicates with a major portion of the bottom of the cylindrical cavity. A valve port is bored directly in the housing or in a valve seat member fitted into the housing in alignment with the central longitudinal axis of the cavity and communicates with a fluid conduit in the housing.

In assembly, the valve components are successively inserted into the cylindrical cavity through the cavity opening on the second wall surface. The components include a plate-like member of a magnetic material with a circular center hole and having an outer diameter fitted to the inner peripheral wall of the cylindrical cavity. Also assembled in the cylindrical cavity is a hollow cylindrical electrical coil having an outer diameter loosely fitting to the inner periphery of the cylindrical cavity, and a sleeve of a non-magnetic material having one end abutting against a surface of the plate-like member having a center hole. Also assembled in the cavity is a plunger of a magnetic material having an outer diameter loosely fitting within the inner circumference of the sleeve and having a needle-shaped valve plunger at the forward end for seating or not seating in the valve port in response to coil energization whereby the valve port is opened and closed. A spring biases the plunger toward the valve port, a core having an outer diameter substantially equal to the sleeve diameter fits behind the sleeve.

Substantially externally of the cavity is a retainer formed from a strip of magnetic material by bending the opposite ends of the strip substantially at right angles to form legs at both ends. One leg of the retainer is bifurcated into a pair of leg strips having undulating or wavy portions produced by bending. The pair of leg strips are formed by a central dividing slot extending from the free end of the leg. The other leg at the other end of the retainer is provided with an inwardly bulging or extended portion substantially at the center of the leg. The bifurcated leg of the retainer is inserted in the linear groove of the hydraulic control system housing and is resiliently held in the groove by means of the wavy bent portions. At the same time the other leg is located at the second wall surface of the housing with the bulging portion in abutting engagement with the outer end face of the circular magnetic core.

Accordingly, it is an object of this invention to provide an improved electromagnetic valve which uses the housing of the system to which the valve is applied as a casing for the valve.

Another object of this invention is to provide an improved method for assembling an electromagnetic valve without casing, into a hydraulic control system.

A further object of this invention is to provide an improved electromagnetic valve which is assembled without the use of bolts, screws, welding, riveting, etc.

Still other objects and advantages of the invention will in part be obvious and will in part be apparent from the specification.

The invention accordingly comprises the several steps and the relation of one or more such steps with respect to each of the other, and the article possessing the features, the properties, and the relation of elements, which are exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENTS

Figure 1:
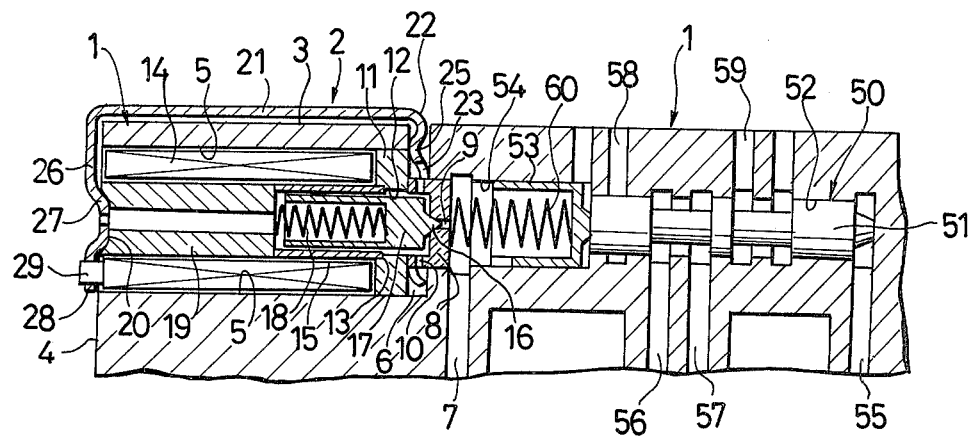
FIG. 1 is a sectional view of an electromagnetic valve in accordance with this invention mounted in the housing of a hydraulic control system of an automatic transmission for a vehicle.
Figure 2:
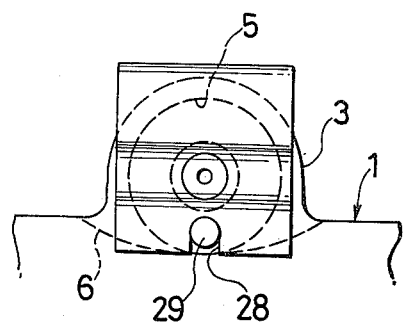
FIG. 2 is a left end view of the valve of FIG. 1.
Figure 3:
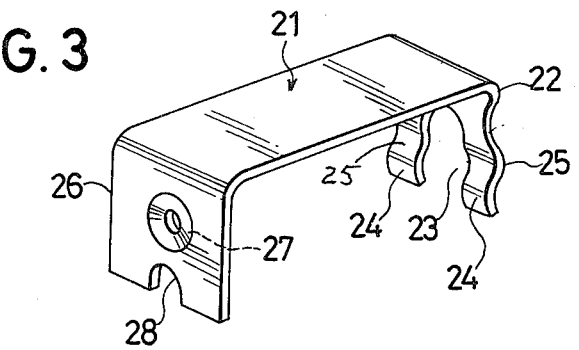
FIG. 3 is a top perspective view of a retainer of the valve of FIG. 1.

With reference to FIGS. 1-3, an electromagnetic valve in accordance with this invention is applied as a drain valve for a pressure chamber in a hydraulic control system of an automatic transmission for a vehicle. A housing 1 of the hydraulic control system is formed with a plurality of passages for supplying pressurized fluid to various pressure chambers such as for brakes, clutches, shift valves, as well as a spool valve for distributing the pressurized fluid to the different pressure chambers. FIG. 1 illustrates an embodiment in accordance with this invention where an electromagnetic valve 2 is built into the housing 1 in combination with a pressure-responsive spool valve 50 which distributes the pressurized fluid.

As best seen in FIG. 2, an upper wall surface 3 of the housing 1 extends out in a semi-cylindrical contour. The semicircular bulge has within it two axial bores. The valve 2 is contained within a cylindrical cavity 5 in the housing 1 comprised in part of the upper wall surface 3. Formed coaxially with the cylindrical cavity 5 is a first axial bore 52 of a smaller diameter slidably receiving therein a spool valve 51, a second or intermediate axial bore 54 of larger diameter than that of the bore 52 but smaller than the bore of the cylindrical cavity 5, slidably receives a plug 53 therein. The plug 53 operates to impose a fluid pressure on the valve 51. As seen in FIG. 1, the bores 5,52,54 extend parallel to the upper wall surface 3 with their common central line extending from an outer end wall surface 4 of the housing 1. The wall surface 4 is disposed substantially at right angles with the upper wall surface 3.

A linear groove 6 located between the second axial bore 54 and the cavity 5 opens onto the upper wall surface 3 perpendicularly to the longitudinal central axis of the axial bore 54 and the cavity 5. The groove 6 communicates with the axial bore 54 as well as with the entire sectional area of the cylindrical cavity 5.

In assembly, the spool valve 51 is inserted into the first axial bore 52 by passing through the cylindrical cavity 5. Then, a slidable plug 53, having a protrusion on its forward end for pressing against the spool valve 51, is put in the second axial bore 54. Thereby, the spool valve 51 is displaced axially in response to the pressure variations in the passage 7 which is in communication with the second axial bore 54 and allows the pressures in the passage 7 to act on the backside of the plug 53. This construction constitutes a pressure responsive spool valve 50 which in operation drains the pressurized fluid in the passages 56 and 57 to the passages 58,59, respectively.

Also inserted through the cavity 5 are a spring 60 which biases the plug 53 and a bottomed cylindrical valve seat 8 of a non-magnetic material which is shaped to fit without leakage in the inner periphery of the second axial bore 54. The cylindrical valve seat 8 seals the second axial bore 54 from the groove 6 except for radial passages 10 through the side wall of the valve seat 8. An axial valve port 9 passes through the forward wall of the valve seat 8 and is coaxial with the axis of the bores 5,52,54.

Next, in assembling the valve 2 in the housing 1, a plate-like member 11 having an annular shape, with a center aperture 12 coaxial with the outer periphery of the plate-like member 11, fits in the inner periphery of the central cavity 5. The plate-like member 11 abuts against the free or rearward end of the cylindrical wall portion of the valve seat 8. Thus, the cavity 5 is isolated from the groove 6. The inner left surface (FIG. 1) of the plate-like member 11 includes an annular stepped portion 13.

An electrical coil 14 fits within the cavity 5 behind the plate-like member 11, that is, on the left side in FIG. 1. The coil 14 is wound in the form of a hollow cylinder with an outer diameter which loosely fits against the inner wall surface of the cavity 5 and with an inner diameter which is slightly greater than the inner diameter of the central aperture 12 of the plate-like member 11. A cylindrical sleeve 15 of non-magnetic material fits within the coil 14 concentrically with the longitudinal axis of the cavity 5. The sleeve 15 has an outer diameter having a tight fitting engagement with the inner periphery of the stepped portion 13 around the inner rear edge of the central aperture 12 of the plate-like member 11. The cylindrical surface within the sleeve 15 is concentrically aligned with the cavity 5 and contains a plunger 17 of a magnetic material which is provided with a needle valve 16 located on the forward end of the needle valve 16 and on the central axis. A cylindrical core 19 of magnetic material is positioned behind the plunger 17 and a spring 18 is fitted between a rear surface of the plunger 17 and the cylindrical core 19. The core 19 at its forward end, that is, the right end in FIG. 1, has substantially the same diameter as the outer diameter of the sleeve 15. At the other end, the core 19 includes a recess 20.

With reference to FIG. 3, a retainer 21 comprises a thin spring steel sheet formed as a U-shaped bracket having a rectangular base with legs extending at right angles to the base. One leg 22 of the retainer 21 is bifurcated into leg strips 24 by a slot 23 which extends centrally for a predetermined length from the free end of the leg 22. The leg strips 24 have wavy undulating contours, as by bending, over the entire lengths thereof as indicated by the reference numerals 25. The other leg 26 includes a portion 27 which extends or bulges inwardly toward the strips 24 and is located at the center of the leg width for engagement with the recess 20 on the external end face of the core 19.

In assembling, the leg 22 comprised of the strips 24 of the retainer 21 is inserted in the groove 6 of the housing 1. The other leg 26 is positioned along the wall surface 4 of the housing 1. The slot 23 in the leg 22 has a width which is greater than the outer diameter of the plunger 17, such that the leg strips 24 press resiliently against the plate-like member 11 with the wavy portions 25, and the plunger 17 is positioned centrally in the slot 23 between the strips 24. At the same time, the inwardly extending bulged portion 27 of the other leg 26 is fitted into the recess 20 of the core 19. Therefore, the plate-like member 11, sleeve 15 and core 19 are held together in compression by the resilient force of the retainer 21 in a position concentric with the center axis of the cavity 5.

The needle valve 16 of the plunger 17, under the influence of the biasing force of the spring 18, is seated on the valve seat 8 thereby closing the valve port 9. A conical valve seat, complimentary in shape to the needle valve 16 is formed around the valve port 9 to shut off the flow of pressurized fluid when the needle valve 16 is seated. The retainer 21 with the wavy portions 25 in the leg 22, is securely held in position by the resilient force of the bent portions 25 which fit tightly in the linear groove 6. An electrical lead wire 29 to the coil 14 passes through a notch 28 provided at the free end of the leg 26 of the retainer 21. The presence of the lead wire 29 serves to block accidental rotation of the retainer 21.

In the construction as described above, a closed magnetic circuit is provided comprising the retainer 21, core 19, plunger 17, plate-like member 11 and return to the retainer 21. Therefore, the plunger 17 is pulled to the left (FIG. 1) against the action of the spring 18 upon energization of the coil 14 through its lead wire 29. When the coil is energized, the needle valve 16 retracts to open the valve port 9. When the needle valve 16 retracts and opens the valve port 9, pressurized fluid in the second axial bore 54 in communcation with the valve port 9 and also in the passage 7, flows, that is, drains, into the groove 6 through the valve port 9, thereby dropping the pressure in the axial bore 54.

As a result, pressure in the passage 55 overcomes the pressure in the axial bore 54 and displaces the spool 51 to the left such that pressurized fluid in the passages 56,57 drains to the passages 58,59, respectively.

Figure 4:
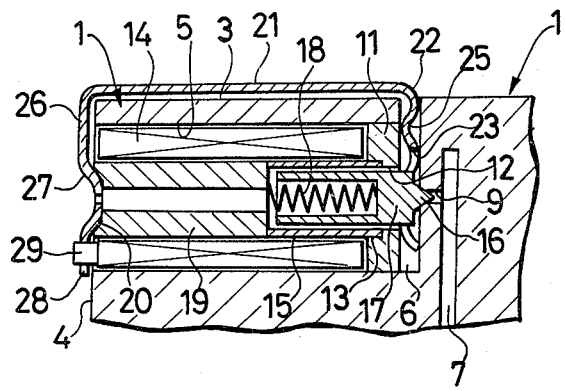
FIG. 4 is a sectional view of an alternative embodiment of an electromagnetic valve in accordance with this invention.

FIG. 4 illustrates an alternative embodiment of an electromagnetic valve in accordance with this invention which is a modification of the valve of FIG. 1. In FIG. 4, the valve port 9 is formed directly in the housing 1 in communication with the passage 7 and the groove 6. The passage 7 is connected to the groove 6 through the port 9 when the coil 14 is energized as described above. The housing 1 is complete with the passage 7, the cylindrical cavity 5, groove 6 and valve port 9. For assembly of this modified valve, the plate-like member 11, coil 14, sleeve 15, plunger 17, spring 18 and core 19 are inserted in the order described into the cavity 5 and held in their respective positions resiliently by the retainer 21. In FIG. 4, those component parts which correspond to similar component parts in FIGS. 1 to 3 are designated by similar reference numerals.

Figure 5:
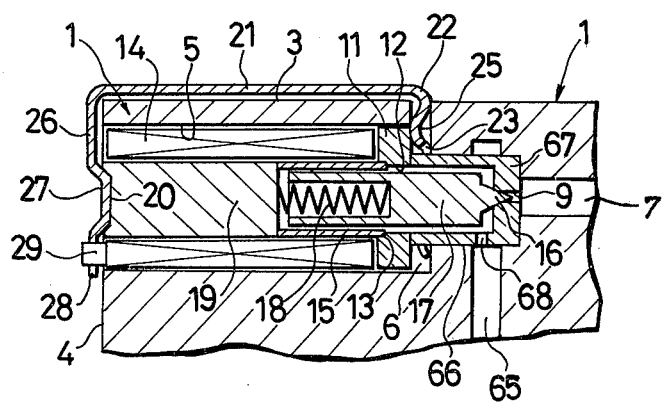
FIG. 5 is a sectional view of another alternative embodiment of an electromagnetic valve in accordance with this invention.

Referring to FIG. 5, another alternative embodiment of an electromagnetic valve in accordance with this invention is shown. The housing 1 includes the central cavity 5 as described above connected to an axial bore 66 of lesser diameter which in turn connects with a passage 7 initiating along the same central axis of the cavity 5 and axial bore 66. A passage 65 enters the bore 66 at substantially a right angle to the central axis of the bore 66 and cavity 5. A valve seat 67 is formed in the shape of a blind-bottom cylinder which is seated in the axial bore 66 so as to separate the passage 7 from the axial bore 66 except through a valve port 9 in the bottom of the valve seat 67 as described hereinafter. The passage 65 communicates with the axial bore 66 through a port, for example, a bore hole 68, through the side wall of the valve seat 67. Thus, the passage 65 communicates with the passage 7 when the plunger 17 is retracted by coil energization and the needle valve 16 moves out of the valve port 9.

The cavity 5 and the axial bore 66 of smaller diameter are formed through one wall surface 4 of the housing 1 such that the axial bore 66 communicates with the passages 7 and 65. The ports 9,68 are formed in the valve seat 67, for example, by boring, before the valve seat 67 is fixedly positioned in the axial bore 66. Thereafter, in assembly, the plate-like member 11, coil 14, sleeve 15, plunger 17, spring 18 and core 19 are inserted into the cavity 5 through open end surface 4 in the sequence described immediately above. The inserted components of the electromagnetic valve are then resiliently held in their respective positions by the retainer 21, which as described above, engages the groove 6 by means of the wavy portions 25 at one end, and engages the recessed portion 20 of the core 19 with the protruding portion 27 of the retainer 21 at the other end.

In FIG. 5, those components which are the same as components in FIGS. 1-3 and perform the same function, are designated by the same reference numerals.

When the coil 14 is energized, the plunger 17 is retracted whereby the needle valve 16 is removed from the port 9 and communication is provided between the passages 7,65. When the coil 14 is de-energized, the spring 18 returns the plunger 17 to the forward position with the needle valve 16 entering and obstructing the port 9 whereby passage 7 is isolated from the side of the valve seat which communicates with the passage 65 through the port 68. When the port 9 is closed, pressurized fluid can drain from within the cylindrical portion of the valve seat 67 through the port 68 to the passage 65. Fluid in the passages 7,65 is always isolated from the groove 6 and the central cavity 5.

There is no necessity for providing a casing for the electro-magnetic valve itself in accordance with this invention, wherein the electromagnetic valve is directly assembled into a cavity in a wall of a housing containing passages for the fluid to be controlled by the electromagnetic valve. The valve port which is controlled by the electromagnetic valve, can be bored directly into the housing as in FIG. 4. Even in embodiments (FIGS. 1,5) where the valve port is provided in the valve seat, it is easy to form the valve port concentrically with the cavity in which the electromagnetic valve is to be assembled because the valve seat is received in an axial bore which is concentric with the cylindrical inner wall of the cavity.

The plunger with the needle at one end to be seated or unseated in the valve port for opening and closing the valve is resiliently held in position by a spring in the central bore of the annular plate-like member 11 which is fitted in the cavity. Further, the needle valve is in a sleeve 15 which is also concentrically positioned in the cavity 5 in abutting engagement with the peripheral edges of the center bore of the plate-like member 11. Thus, the plunger slides along the longitudinal axis of the cavity with extreme ease to open and close the aligned valve port 9.

The plate-like member 11 and sleeve 15 are retained in compression in abutting positions by the two legs 22,26 of the retainer 21 and these members 11,15 are positioned coaxially with the cylindrical core 19 which has substantially the same outer diameter as the sleeve 15. The cylindrical core 19 has one end abutting concentrically against the sleeve 15 and the other end of the core 19 is positioned at the open end of the cavity 5 in the housing 1. The retainer 21 has one leg 22 with the wavy bent portions 24,25 inserted in a linear groove 6 in the housing 1 and the other leg 26 located along the wall surface 4 of the housing 1 in such a manner as to grip one part of the housing. Thereby, the plate-like member 11, sleeve 15 and core 19 are held in predetermined positions within the cavity 5 of the housing 1 and relative to each other without any other fixing means. There is no welding, caulking, riveting, bolting or the like.

The coil 14 is also held in position within the cavity 5 by the retainer 21 in a concentric relationship with the plunger 17 and core 19. Additionally, the retainer 21, which constitutes a portion of a closed magnetic loop, together with the core 19, plunger 17 and plate-like member 11, contributes to provide an electromagnetic valve in accordance with this invention of an extremely simplified construction.

Further, the centering of the valve port 9, center bore of the plate-like member 11 and sleeve 15 is facilitated because these components can be assembled with reference to the longitudinal central axis of the cylindrical inner wall of the cavity 5. The operating space for the plunger 17, which is defined by the assembled length of the core 19, sleeve 15 and plate-like member 11, and the position of the valve port 9 can be located with good dimensional accuracy because the core 19, sleeve 15 and plate-like member 11 are held in position under compression by the retainer 21 along with part of the housing. Further, the valve port 9 is bored directly in the housing or in a valve seat member which is fitted in the housing.

For assembling the electromagnetic valve in accordance with this invention, a cylindrical cavity 5 is bored into a wall surface parallel to another wall surface which is perpendicular to the bored wall surface of the housing. The housing is formed with a linear groove 6 at the inner end of the cavity 5, the linear groove being perpendicular to the longitudinal axis of the cylindrical cavity 5. A valve port is bored directly in the housing, or in a valve seat member, into communication with a fluid passage in the housing. Therefore, the valve is assembled accurately into the cavity 5 of the housing 1 simply by inserting the plate-like member 11, coil 14, sleeve 15, plunger 17, spring 18, and core 19, in that sequence. These components are assembled through the opening of the cavity resulting from the boring of the cavity. Then one leg of the retainer 21 is engaged against the plate-like member 11 within the linear groove 6 and the other leg of the retainer 21 is engaged against the outer end surface of the core 19. Thus, the valve is assembled without resorting to ordinary fastening or holding means such as welding, caulking, riveting, bolting or the like.

In the embodiments described above, the cavity 5, the bore hole, valve seat, plunger, coil, etc., have been described as cylindrical. However, it should be understood that in alternative embodiments of electromagnetic valves in accordance with this invention, these spaces and components need not be limited to cylindrical contours. Other shapes, for example, square, hexagonal, etc., can be utilized with their longitudinal axes in alignment. As described above, the retainer 21 holds the valve components in their relative positions within the cavity. It should also be understood that some components in a valve assembly may be cylindrical whereas others may have other cross-sections, in the same valve without departing from the spirit of this invention.

It will thus been seen that the objects set forth above, among those made apparent from the preceding description, are efficiently attained and, since certain changes may be made in carrying out the above-mentioned method and in the article set forth without departing from the spirit and scope of the invention, it is intended that all matter contained in the above description and shown in the accompanying drawings shall be interpreted as illutrative and not in a limiting sense.

What is claimed is:

1. An electromagnetic valve, comprising:
   a housing of a hydraulic control system in which said electromagnetic valve is incorporated for operation, said housing having a portion defined by intersecting first and second wall surfaces, and a fluid conduit in said housing;
   a cavity, said cavity being formed into said second wall surface and opening onto said second wall surface;
   a groove formed into said first wall surface and opening onto said first wall surface and intersecting said cavity and cavity communicating with a portion of the cross-sectional area;
   components of an electromagnetic valve, said components being functionally arranged within said cavity and adapted for opening and closing a pathway of communication with said fluid conduit when said valve is actuated, the interior surfaces and walls of said cavity being the casing for said valve components;
   a retainer, said retainer being formed in a U-shaped bracket from a spring material and having two ends and an intermediate portion, one said end having wavy undulating portions, said one end being inserted and resiliently held in said groove by means of said wavy undulating portions and engaging at least one said functionally arranged valve component, the other said end covering at least in part the entrance of said cavity at said second wall surface and engaging at least one said functionally arranged valve component, said valve components being retained between said two ends of said retainer by the resilient force thereof and at least in part within said cavity, by the resiliency of said bracket said bracket both holding said valve components together and also holding said valve in place on said housing.

2. An electromagnetic valve comprising:
   a housing of a hydraulic control system in which said electromagnetic valve is incorporated for operation, said housing having a portion defined by intersecting first and second wall surfaces, and a fluid conduit in said housing;
   a cavity, said cavity being formed into said second wall surface;
   a groove formed into said first wall surface and intersecting said cavity and communicating with a portion of the cross-sectional area of said cavity;
   components of an electromagnetic valve, said components being functionally arranged within said cavity and adapted for opening and closing a pathway of communication with said fluid conduit when said valve is actuated, the interior surfaces and walls of said cavity being the casing for said valve components, said valve components include:
   a valve port in alignment with the center axis of said cavity and communicating said cavity with said fluid conduit in said housing;
   a plate-like member with a center hole, said plate-like member having an outer peripheral surface thereof fitted to the inner peripheral walls of said cavity, said plate-like member forming a face of said groove;
   a hollow sleeve having one end thereof abutted against the peripheral edge of said center hole of said plate-like member, said sleeve being coaxial with the center axis of said cavity;
   a core located in said cavity, one end of said core being in abutting engagement with the other end of said sleeve, the other end of said core being located at the open end of said cavity;
   an electrical coil located between said sleeve and said core and the inner peripheral wall of said cavity;

a plunger of magnetic material fitted in said sleeve, said plunger being slidable along said center axis of said cavity and including a needle valve at one axial end of said plunger for seating engagement with said valve port;

a spring inteposed between said plunger and an inner end face of said core for pressing said needle valve into said valve port said needle valve being withdrawn from said port against the force of said spring upon energization of said coil, whereby an operating valve is formed within said housing, a retainer bracket including two ends and an intermediate portion, one said end engaging said groove and at least one said functionally arranged valve component, the other said end covering at least in part the entrance of said cavity at said second surface and engaging at least one said functionally arranged valve component, said valve components being retained between said two ends and at least in part within said cavity.

3. An electromagnetic valve as claimed in claim 2, wherein said valve port comprises a flow opening through a portion of said housing.

4. An electromagnetic valve as claimed in claim 2, wherein said valve port comprises a valve seat member, said valve seat member being fitted in said housing and having a flow opening therethrough.

5. An electromagnetic valve as claimed in claim 2, 3 or 4, wherein said first and second housing surfaces intersect substantially perpendicularly.

6. An electromagnetic valve as claimed in claim 2, 3, or 4, wherein said cavity is cylindrical.

7. An electromagnetic valve as claimed in claim 5, wherein said cavity is cylindrical.

8. An electromagnetic valve as claimed in claim 2, 3 or 4, wherein said retainer and said plate-like member is formed of a magnetic material and said sleeve is formed of a non-magnetic material.

9. An electromagnetic valve as claimed in claim 8, wherein said cavity is cylindrical.

10. An electromagnetic valve as claimed in claim 9, wherein said first and second surfaces of said housing are substantially perpendicular one to the other.

11. An electromagnetic valve as claimed in claim 2, 3 or 4, wherein said one end of said retainer includes wavy or undulating leg strips inserted in said groove, said retainer being resilient, said leg strips abutting said at least one valve component.

12. An electromagnetic valve as claimed in claim 11, wherein said other end of said retainer includes a protruding portion, said protruding portion abutting said at least one valve component, whereby said valve components are compressed together by said resilient retainer.

13. An electromagnetic valve, comprising:

a housing of a hydraulic control system in which said electromagnetic valve is to be incorporated, having an edge portion defined by perpendicularly intersecting first and second wall surfaces;

a cylindrical cavity bored into said second wall surface and having the center axis thereof disposed parallel with said first wall surface of the edge portion;

a linear groove bored into said first wall surface perpendicularly to the center axis of said cylindrical cavity and communicating with a portion of the sectional area of said cylindrical cavity;

a valve port bored directly in said housing in alignment with the center axis of said cylindrical cavity and communicating with a fluid conduit in said housing;

a plate-like member of a magnetic material with a circular center hole, said plate-like member having the outer peripheral surface thereof fitted in the inner peripheral wall of said cylindrical cavity in face-to-face relation with said groove;

a sleeve of a non-magnetic material having one end thereof abutted against the marginal edges of said center hole of said plate-like member concentrically with said cylindrical cavity;

a cylindrical core of a magnetic material located concentrically in said cylindrical cavity in abutting engagement with the other end of said sleeve and having substantially the same outer diameter as said sleeve, the other end of said core being located at an open end of said cylindrical cavity;

a coil located between the outer peripheries of said sleeve and magnetic core and the inner peripheral wall of said cylindrical cavity;

a plunger of a magnetic material fitted in said sleeve slidably along the center axis of said cylindrical cavity and provided with a needle valve at one axial end thereof for seating engagement with said valve port, the other end of said plunger being engaged with one end of a spring interposed between said plunger and the inner end face of said core; and a retainer in the shape of a bracket formed from a sheet of resilient material, one leg of said retainer being bifurcated by a slot of a predetermined length extending centrally from the free end of said one leg for fitting engagement with said plunger and having wavy or undulating leg strips inserted in said groove in abutting engagement with said plate-like member, the other leg of said retainer covering said opening of said cylindrical cavity on said second wall surface of said housing and having a bulged portion abutted against the outer end face of said core, holding together said plate-like member, sleeve and core under compression in the axial direction by said legs.

14. An electromagnetic valve as claimed in claim 13, and further comprising a second passage in said housing, and wherein said port is in a valve seat member fitted in said housing, said seat member being a bottomed cylinder of a non-magnetic material fitted in a second axial bore concentric with said cavity, and said valve port is formed in the bottom wall of said valve seat member in communication with said fluid passage in said housing, the cylindrical wall of said valve seat member having a port in communication with said second fluid passage in said housing.

15. An electromagnetic valve as claimed in claim 13 or 14, and further comprising, fitted in said housing, a disc of a non-magnetic material received in an axial bore formed in said housing concentrically with said cavity and in communication with said first fluid passage in said housing, said axial bore having built therein a pressure-responsive means.

16. A method for assembling an electromagnetic valve in a housing of a hydraulic control system, comprising the steps of:

forming a cylindrical cavity into a second wall surface of said housing, the longitudinal axis of said cavity being in parallel relation with a first wall surface, said first wall surface perpendicularly intersecting said second wall surface;

forming a linear groove into said first wall surface perpendicularly to the longitudinal axis of said cylindrical cavity and in communication with a portion of the sectional area of said cylindrical cavity at a bottom portion thereof;

communicating said bottom portion of said cylindrical cavity with one of a plurality of conduits formed in said housing;

and forming a valve seat with a valve portion in alignment with the longitudinal axis of said cylindrical cavity;

successively inserting into said cylindrical cavity through the opening of said first wall surface;

(a) a plate-like member of a magnetic material having an outer diameter fitting to the inner periphery of said cylindrical cavity and a center hole concentric with said cavity, (b) a hollow cylindrical electrical coil having an outer diameter fitting to the inner periphery of said cylindrical cavity, (c) a sleeve of a non-magnetic material having the fore end thereof abutted against one side of said center hole of said plate-like member;

(d) a plunger of a magnetic material having a needle valve at the fore end thereof and an outer periphery loosely fitting in said sleeve, said needle valve being seated on and off said valve port for closing and opening same, (e) a spring for biasing said plunger to seat on said valve port, and (f) a core having an outer diameter substantially the same as the diameter of said sleeve; and fixing a retainer on said housing, said retainer being formed from a strip of a magnetic material in the shape of a bracket, said bracket having opposite end portions of said strip folded to the same side, one leg of said retainer having wavy bent portions, the other leg of said retainer being provided with a bulged portion, said fixing being accomplished by said one leg being inserted and resiliently fixed in said linear groove by said wavy bent portions, and said other leg being extended along said wall surface with said bulged portion in abutting engagement with the outer end face of said core.

* * * * *